United States Patent [19] [11] 3,760,351
Thomas [45] Sept. 18, 1973

[54] APPARATUS AND PROCESS FOR DEVELOPING ELECTROMAGNETIC ENERGY FROM TIRE FLEXURE

[76] Inventor: Stephen Edward Thomas, 13664 Ronnie Way, Saratoga, Calif. 95070

[22] Filed: July 2, 1971

[21] Appl. No.: 159,272

[52] U.S. Cl. .............................. 340/58, 200/61.23
[51] Int. Cl. ............................................ B60c 23/06
[58] Field of Search .................... 340/58; 200/61.22, 200/61.23, 61.25

[56] References Cited
UNITED STATES PATENTS

| | | | |
|---|---|---|---|
| 1,772,949 | 8/1930 | Jacoby | 340/58 |
| 2,274,557 | 2/1942 | Morgan et al. | 340/58 UX |
| 3,453,590 | 7/1969 | Burgess et al. | 340/58 |
| 3,568,145 | 3/1971 | Dikoff | 340/58 |
| 3,593,269 | 7/1971 | Richardson | 340/58 |
| 2,629,086 | 2/1953 | Ainsworth et al. | 340/58 |

Primary Examiner—Alvin H. Waring
Attorney—John A. Young

[57] ABSTRACT

Mounted within a flexible pneumatic tire is an actuator which is reciprocated radially by the normal distortion of the tire as it moves into ground-engagement, is depressed and then expands to its original position as it moves out of ground-engagement. The periodic engagement and disengagement produces a radially reciprocable movement which is used to operate an electromagnetic generator, and the energy derived from the generator is usable either for operating an electrically operable device, or the signal may be monitored to indicate tire parameter conditions such as heat, inflation pressure and other such conditions.

A plurality of actuators are locatable within the tire each of which is radially displaceable by the successive engagement and disengagement of the tire with the ground, and each device is successively operative in relation to the electromagnetic generator.

3 Claims, 11 Drawing Figures

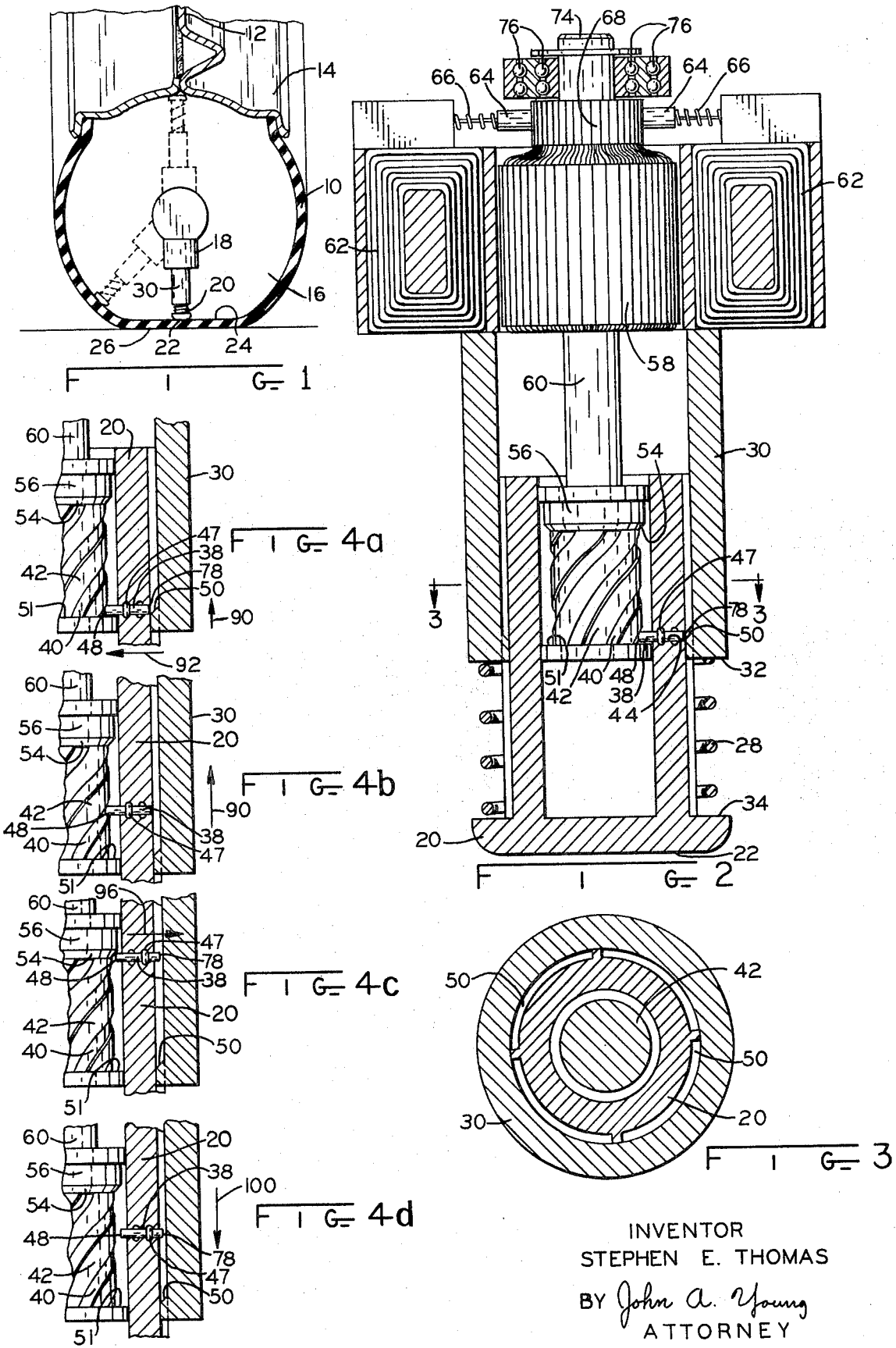

INVENTOR
STEPHEN E. THOMAS
BY John A. Young
ATTORNEY

APPARATUS AND PROCESS FOR DEVELOPING ELECTROMAGNETIC ENERGY FROM TIRE FLEXURE

BACKGROUND OF THE INVENTION

For many years, the art has sought an inexpensive and reliable tire monitoring device which will tell the operator when the tire has reached dangerous operating condition, such as tire underinflation, tire overinflation, excess tire heating and the like.

One of the reasons why such devices have not become popular is that they are either too complex and therefore expensive, or they require a power source which is unreliable, overly affected by operating conditions and the like. For example, tire warning devices are available which are pressure responsive and which emit a signal by transmitter, but all too frequently the signal becomes distorted, lost, and suppressed by conditions which are encountered during normal vehicle usage. Consequently, the monitoring of a tire remains a substantial unsolved problem.

The present invention proposes to solve a number of the outstanding problems including first of all the provision of a different power source by which tire conditions become self-monitored. As part of the normal tire operation, a portion of the periphery of the tire as it comes into ground-engagement is depressed into a "foot" which is elliptical in outline and represents a radial decrease because of the weight of the vehicle on the ground. As the foot passes out of engagement with the ground, it returns to its normal position with the net effect being a slight radial flexure of each segment of the tire as it comes successively into ground-engagement and then out of ground-engagement. This tire flexure movement represents an untapped source of energy, and I intend to be the first to recognize this potential energy source as a means for generating the power and a signal whereby the tire itself becomes a source of energy for powering signal generation which in turn monitors tire parameters.

The reason why previous tire monitoring devices are both inaccurate and unreliable is that they are battery operated and the battery is adversely affected by environmental conditions and pilfering; in the present invention, the emitter has proper shielding and a reliable power source which is less subject to change in transmitting characteristics as a function of environment.

As a result, the art of monitoring tire conditions is now possible and has answered the prior unanswered problems.

Monitoring a tire is not limited to providing information on tire inflation, tire temperature, etc. Other useful data can be monitored as for example, the rate of speed of the tire, such information is then compared with other tires of the vehicle to determine whether the vehicle is skidding and corresponding adjustments then made in braking effort at the respective wheels.

From the foregoing, it will be seen that a highly valuable result is achieved by the present invention wherein a self-contained unit is disposable within a tire in a shielded condition and which can generate power from a heretofore untapped source, namely tire flexure, and will thereby provide a signal which is usable for monitoring tire conditions, such as temperature, inflation, etc., and can furthermore be used to determine the rate of rotation of the tire so that information is available for skid control operation.

All of the foregoing is achievable by means of a simple device which does not have to be externally powered, but which is self-powered, self-contained and is located in such manner as to be subject to minimal distrubances from outside conditions normally encountered in a variety of locations.

OBJECTS OF THE INVENTION

It is the principal object of the present invention to provide a self-contained unit which is powered by normal flexure of a tire and is located within a tire to provide a continuous monitoring of tire conditions, including inflation, temperature, bearing temperature, etc.

Another object of the present invention is to provide a device which is located within a tire and is shielded from outside environmental conditions so as to provide an emitted signal which is carefully calibrated to tire conditions and is subject to minimal extraneous disturbances.

A further object of the present invention is to provide a unit which is disposed within an automobile tire and utilizes the normal flexure of the tire as a power source for generating electrical energy, such energy being usable for a variety of different purposes, including illumination, generation of RF or sonic transmitting waves, and allows a central pickup for signal identification, usable for a variety of different purposes as for example skid control operation or the like.

An overall object of the present invention is to provide a simple and inexpensive device which requires no external power other than normally derived from the normal flexure of the tire, and to utilize such energy previously untapped and ignored as an energy source, whereby such derived energy is usable for a variety of useful purposes. Related to this object is the further object that the described device is locatable within a tire so as not to be subject to theft, disturbance in any manner from outside sources, and is shielded by the tire itself, so any signal obtained from the device is related almost solely to tire conditions, and is therefore a reliable source of RF or sonic transmission.

Other objects and features of the present invention will become apparent from a consideration of the following description which proceeds with reference to the accompanying drawings.

DRAWINGS

FIG. 1 is a sectional view of an automotive tire which incorporates the present invention therein, the actuator being shown in grounded-engaging position in full line, and the two dotted line ground-engaging are the same actuator when the tire is rotated 180°, and 315° from ground-engagement, rotating out of the plane of the paper;

FIG. 2 is an enlarged sectional detail view of the actuator which illustrates the actuator in an extended position;

FIG. 3 is a sectional view taken on line 3—3 of FIG. 2;

FIGS. 4A, 4B, 4C and 4D are progressive views illustrating first compression stroke of the actuator effecting rotation of the armature in 4A, 4B, 4C, and the elongation during 4D until return to the starting point of 4A;

GENERAL DESCRIPTION OF THE INVENTION

Figure 5:
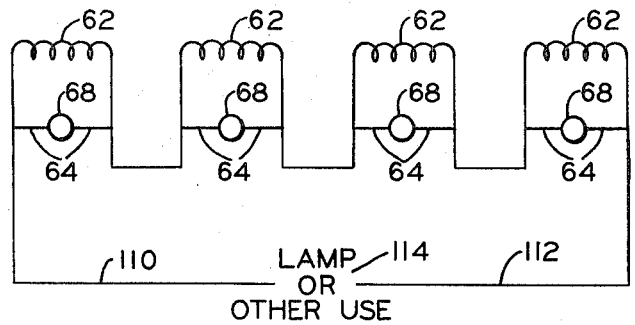
FIGS. 5, 6 and 7 are schematic circuit diagrams illustrating how a plurality of the generators are combinable to produce electrical energy.

Referring to FIG. 1, a vehicle tire designated generally by reference numeral 10 has a wheel disc 12 with a rim 14 and inflatable tire 16 mounted thereon. Within the tire 16 are one or more circumferentially spaced devices 18, each consisting of a plunger 20 engageable at 22 with the internal surface 24 of tire tread 26.

A spring 28 holds the plunger 20 in a normally extended position wherein the end 22 is in engagement with tire surface 24. The plunger 20 moves reciprocably within a sleeve 30 and spring 28 bears at one end against a shoulder 32 of the fixed sleeve 30, and a shoulder 34 of the plunger 20 to urge the plunger 20 in an expanding direction. The plunger 20 carries a camming pin 38 which enters into one or another of the helical grooves 40 constructed within a rotatable follower 42 which is of cylindrical construction and is caused to rotate by movement of the camming pin 38 longitudinally relatively thereto.

The camming pin 38 is held within an opening 44 by detent 47 which permits the pin to move within the opening 44 so that the end 48 is either within one of the helical grooves 40 or is out of engagement therewith. An inclinded cam face 50 (FIGS. 2, 4B, 4D) on the end 32 of sleeve 30 cams the pin radially inwardly to the position shown in FIG. 2 when the spring 28 fully extends the plunger 20 and plunger movement is limited outwardly by engagement of pin end 48 with an annular abutment 51 at the end of follower 42. The pin 38 is biased inwardly by inclined cam surface 54 which is formed at the upper end 56 of the follower 42.

When the follower 42 rotates, it also rotates armature 58 which is connected to follower 42 by a shaft 60. As the armature 58 rotates, it cuts the lines of force surrounding coil 62 and a series of brushes 64 which are loaded by springs 66 against commutator 68 communicate electrical energy to an electrical circuit for some useful purpose. End 74 of shaft 60 is mounted on antifriction bearings 76 as indicated in FIG. 2.

The plunger 20 is caused to move upwardly (FIG. 4A, 4B, 4C) since its end 22 engages the tire portion 24 which is radially foreshortened as the tire comes into engagement with the ground and forms an elliptical "foot," foreshortening the distance from the tread of the tire 16 to its center. The sequence of operation is such that, as the device is rotated with the tire 16 and a portion of the tire 26 becomes depressed, the plunger 20 is moved upwardly as indicated in FIG. 4A. At the maximum extended stroke of plunger 20,(which is the plunger position just prior to ground engagement) pin 38 is biased fully inwardly by engagement of its end 78 with the inclined surface 50 on the end 32 (FIG. 2) of sleeve 30 so that as the plunger moves upwardly in the direction of the arrow 90 (FIG. 4A) with the pin 38 at its inward position as indicated by the arrow 92, upward movement of the plunger, by reason of engagement of end 46 of the pin within the helical grooves 40, will impart a turning effort on the follower 42, effecting a rotational movement thereof, together with the shaft 60 and rotor 58.

The rotation of the rotor 58 relatively to the field 62 will generate in electromagnetic force communicable through commutator 68, and brushes 64 to an electrical circuit for performing useful work. As indicated in 4C, as the plunger reaches its maximum contracted or upward movement, the end 46 of pin 38 is moved in the direction of arrow 96 by engagement with the inclined surface 54 on follower 42. At this point, the portion of tire engageable with end 22 is moved out of engagement with the ground, and the natural flexure of the tire to its normal position will move the plunger 20 in the opposite direction, in the direction indicated by arrow 100 (FIG. 4C) and pin 38 will be moved relatively to the follower 42 in the direction of the arrow 100 (FIG. 4B) until the end 38 engages inclined cam surface 50 (FIG. 4A) and is cammed inwardly in the direction indicated by arrow 92 whereupon end 46 will reengage surface 50 and prevent further extending movement of the plunger 20 under the action of the spring 28 which produces extending movement of the plunger.

Within a single tire, there may be one or more of the described devices 18 and, as indicated in FIG. 5, the devices can be connected in series for maximum voltage and constant current, with a shunt field coil to commutator brushes, so that each commutator 68 and field coil 62 are shunt-wound with conductors 110, 112, connecting the shunt connected field coil to commutator series connection, to a lamp 114 or other use.

Figure 6:
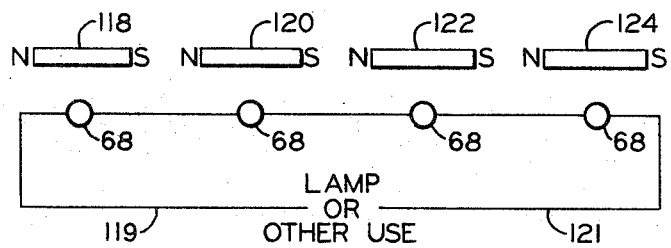

Another manner of connecting the various devices is indicated in FIG. 6, in which permanent magnets 118, 120, 122, 124 are provided with the commutators connected in series and conductors 119, 121 connected to a lamp or other use.

In a still further arrangement, if maximum current is required and constant voltage, the devices are connected in parallel with the opposite sides of each coil connected respectively to conductors 130, 132, as indicated by terminals 134, 136, for each field coil.

Figure 8:
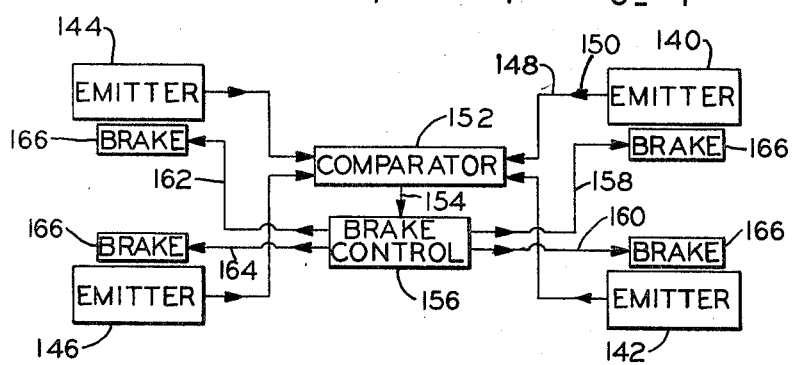
FIG. 8 is a block diagram illustrating how the device is usable as a skid control system.

Referring next to FIG. 8, devices 18 generate an RF or other signal designated by emitters 140, 142, 144 and 146 which are associated with each of the vehicle wheels and transmit a signal which is a measure of the rate of rotation of the associated wheel through an associated conductor 148 in the direction of the arrow 150 to a comparator 152. The comparator distinguishes which of the wheels is rotating at a slower relative speed and transmits this signal through conductor 154 to a brake control 156, having hydraulic connections 158, 160, 162 and 164 with brakes 166 associated one with each of the wheels of the vehicle. In the event that any one of the wheels associated with the emitter 142 is locked, indicating a skid, then brake applying force is relieved so that the wheel or wheels can resume speed.

Thus, the device 18 can generate a signal which is in accordance not only with tire conditions but also wheel speed. There is also comprehended within the teaching of the present invention, the use of an output signal of the device to indicate tire conditions and wheel speed, or a combination of both tire signalling and wheel speed to obtain anti skid control.

OPERATION

In operation, device 18 located within the tire 16 is brought into the full line position shown in FIG. 1 with each revolution of the tire. When the device 20 is in the full line position of FIG. 1, a portion of the tire tread in contact with the end of plunger 20 becomes radially foreshortened with the tread being deformed into an elliptical "foot" and causing the plunger to become foreshortened moving in the direction of the arrows 90, FIGS. 4A and 4B. As the plunger foreshortens against the resistance of spring 28, the pin 38 which is biased so that its end 46 is brought within one of the helical grooves 40 of the follower 42 and will cause the follower 42 to rotate, such rotation acting through shaft 60 to corrotate rotor 58.

Relative rotation between rotor 58 and field coil 62 will generate an EMF which is transferred through commutator 68 and brushes 64 to an electrical circuit which is available for energizing a lamp, a signalling device, for generating an RF or audio signal, transmitting a signal to a comparator 152 to indicate wheel speed, acceleration and deceleration data or a combination of these purposes.

When the plunger reaches its maximum extent of contraction (FIG. 4C), the end of pin 38 comes into contact with surface 54 biasing the pin 38 inwardly, and at this point the tire is rotated out of contact with the ground and the natural flexure of the tire will cause the tread to expand outwardly, thus permitting the spring 28 to extend the plunger 20 in the direction of the arrows 100 (FIGS. 4C and 4D). The maximum extension of the plunger is determined by engagement of the end 46 of the pin with the annular stop 50 of the follower 42, the pin being then moved inwardly again in the direction of the arrow 92 (FIG. 4A) at the end of the longitudinal extension stroke of the plunger by the spring 28. Thus during upward plunger movement the pin engages follower 42 and rotates it; during downward plunger movement the pin is out of engagement with the rotor.

It thus occurs that torque force is communicated to the rotor 58, each rotation of the tire. The rotation of the tire occurs frequently enough, and sufficient energy is involved during each revolution of the wheel or tire to produce considerable impulses of input energy from the periodic flexure of the tire. As it comes first into engagement with the ground, the ground-engaging tire section is distorted into a "foot" and then passes out of engagement with the ground and resumes its circumferential shape.

The electrical energy derived in the manner described, can be interpreted and is also sufficient in output for a number of useful purposes including the operating of running lights to improve the side vision of the vehicle, operating an alarm to signal underinflation or overinflation, or overheating of the tire, and the signal can also be differentiated to indicate excessive deceleration or wheel lock, these being meaningful signals in anti skid operation.

Figure 7:
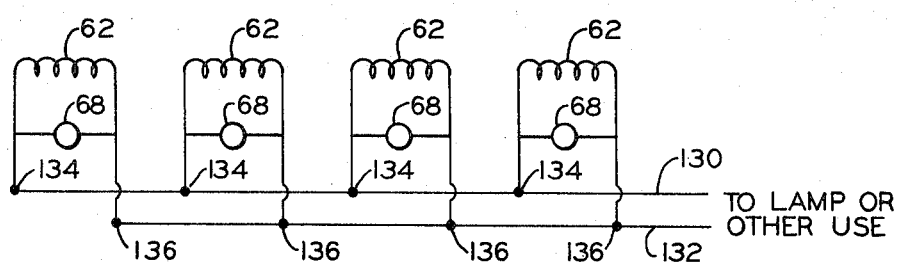

More than one device can be operated for each tire, such devices to be connected in the manner indicated for FIG. 5 as in a shunt field coil, to commutator brushes, and the series connection will provide maximum voltage and constant current; or permanent magnets can be used in place of the field coil and the commutators connected in series as indicated in FIG. 6, or in an even further embodiment indicated in FIG. 7, the devices can have parallel connections to obtain maximum current and constant voltage.

A signal output is further obtainable from each wheel through an associated emitter, such emitter information being transferred to a comparator which in turn regulates a brake control to the respective brake as indicated in FIG. 8.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

I claim:

1. Apparatus for generating electrical energy from tire flexure comprising: force transmitting means disposed within the interior of a vehicle tire and having mounting means therebetween whereby said force transmitting means is arranged to move circumferentially with said tire, an electromagnetic generating means also disposed within said tire, radially displaceable means movable radially responsively to flexure of the tire during rotation thereof, and adapted to move said force transmitting means therewith, and means converting reciprocable movement of said force transmitting means to rotary movement of a portion of said electromagnetic generating means and thereby to generate useful electrical energy.

2. The apparatus in accordance with claim 1 including a clutch mechanism between said force transmitting means and said electromagnetic generating means whereby displacement of a coil and core portion thereof is effected only during rotation of the tire.

3. The apparatus in accordance with claim 1 including conductor means for communicating electrical energy generated from said electromagnetic generating means to an output including a signalling device, a source of illumination or the like.

* * * * *